(12) United States Patent (10) Patent No.: US 6,714,897 B2
Whitney et al. (45) Date of Patent: Mar. 30, 2004

(54) METHOD FOR GENERATING ANALYSES OF CATEGORICAL DATA

(75) Inventors: Paul D. Whitney, Richland, WA (US); Don S. Daly, Richland, WA (US); Thomas A. Ferryman, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 323 days.

(21) Appl. No.: 09/753,401

(22) Filed: Jan. 2, 2001

(65) Prior Publication Data

US 2002/0123865 A1 Sep. 5, 2002

(51) Int. Cl.⁷ .............................................. G06F 15/00
(52) U.S. Cl. ..................................................... 702/189
(58) Field of Search ........................ 702/189; 345/440; 706/12, 60; 704/256; 367/73

(56) References Cited

U.S. PATENT DOCUMENTS

| | | | | |
|---|---|---|---|---|
| 4,866,634 A | * | 9/1989 | Reboh et al. | 706/60 |
| 5,452,410 A | * | 9/1995 | Magidson | 345/440 |
| 5,539,704 A | * | 7/1996 | Doyen et al. | 367/73 |
| 5,671,333 A | * | 9/1997 | Catlett et al. | 706/12 |
| 6,185,531 B1 | * | 2/2001 | Schwartz et al. | 704/256 |

OTHER PUBLICATIONS

A Agresti et al., "Categorical Data Analysis", entire book, 1990.
YMM Bishop et al., "Discrete Multivariate Analysis: Theory and Practice", entire book, 1975.
NE Breslow et al., "Statistical Methods in Caner Research", vol. 1,2&3 in entirety, 1980, 1986, 1987.
S Deerwester et al., "Indexing by Latent Semantic Analysis", pp. 391–407. 1990.
G Michailidis et al., "Statiscical Science", pp. 307–336. 1998.
HR Turtle et al., "A Comparison of Text Retrieval Models" pp. 279–290. 1992.

* cited by examiner

*Primary Examiner*—Michael Nghiem
*Assistant Examiner*—Tung Lau
(74) *Attorney, Agent, or Firm*—Woodard, Emhardt, Moriarty, McNett & Henry LLP

(57) ABSTRACT

According to the present invention, a conversion or representation of categorical data was created that allows a significant number of exploratory multivariate analysis methods to be brought to bear on categorical data. Whereas previously, each response to a question might have been modeled as an outcome from a multinomial probability distribution; according to the present invention each response is represented as an actual discrete probability distribution with all its mass in one cell. With this interpretation or conversion, the vector of measurements for each individual can be viewed as a member of the linear space that includes vectors of probability distributions.

33 Claims, 3 Drawing Sheets

(1 of 3 Drawing Sheet(s) Filed in Color)

METHOD FOR GENERATING ANALYSES OF CATEGORICAL DATA

FIELD OF THE INVENTION

The present invention relates to methods for exploratory analysis of categorical data. More specifically, the invention is a method for generating analyses of categorical data that will allow the application of exploratory multivariate analysis procedures.

BACKGROUND OF THE INVENTION

A categorical measurement on an object is a measurement that takes one of a set of known, fixed values, but has a discontinuous relationship with a previous or next measurement. For example: an observation as to whether a switch is "on" or "off" is a categorical measurement; the answer to each question in a political poll or other survey is a categorical measurement. Clock, calendar, and angle measure are also categorical data inasmuch as there are discontinuities, for example 60 minutes per hour, leap year, and 60 minutes per degree.

In addition to clinical and survey data [the "multiple choice" parts of a survey (as opposed to the free text)], other forms of categorical data include but are not limited to data mining, patents, warranty cards, and combinations thereof. Much of data that are often the subject of "data mining" (e.g. for marketing) are categorical (e.g. income level, age bracket, favorite sports and hobbies). However, the size of the data sets to be analyzed in some data mining applications are of a much larger scale than the anticipated size of clinical trials data sets. Patents, thought of as data, contain significant categorical data, and significant data of other types.

Table 1 shows a typical matrix arrangement of categorical data. For definiteness and convenience the data are discussed as though they are obtained as the result of a survey, poll, or questionnaire of multiple choice questions. In the table, each object (or individual) responds to the 4 questions. Possible values are shown for two of the objects; the answers for the first 3 questions are listed in a manner suggesting some character-coded response. The fourth question is listed as though the response is one of a finite list of positive whole numbers. Note that different questions can have different numbers of allowable answers and different coding schemes.

TABLE 1

EXAMPLE OF CATEGORICAL DATA, QUESTIONAIRE

| Person/Object | Q1 | Q2 | Q3 | Q4 |
|---|---|---|---|---|
| 1 | D | A | Q | 1 |
| 2 | B | B | S | 99 |
| 3 | A | A | Q | 2 |
| ... | | | | |
| M | A | C | D | 4 |
| ... | | | | |
| N | D | C | B | 2 |

The current general strategy for summarizing categorical data is to model all of the outcomes of a question (E.G. Q1) as representing outcomes from a single probability distribution, for example a multinomial. Previously, categorical data have been difficult to use for exploratory cause-effect analysis. Most often a query or hypothesis is posed and categorical data is collected and tested statistically to confirm or deny the query or hypothesis. Further treatments of such data (see references [1], [2], and [3]) concentrate largely on describing classes of probabilistic models that might explain or fit the data; the resulting models are then used to confirm whether suspected effects exist. Some methodology for exploratory analysis of categorical data is presented in [4]; these methods focus on calculating optimized encodings of categorical (and other) data.

However, categorical data may contain useful information, supporting a second hypothesis if you will, beyond the data needed to address the first hypothesis, which would not be recognized by methods focused on the first hypothesis. For example, clinical treatments, designed for a particular purpose, sometimes have desirable side effects. Discovering beneficial side effects and the conditions under which they occur can lead to medically and economically significant pharmaceutical products. Isolating detrimental side effects and the conditions under which they occurs is also clinically useful. Relevant data to uncovering these side effects arise from clinical trials when a patient's symptoms and associated properties, either elicited or reported to the health care provider, are encoded into standard classes.

Work with similar intent, that is, retrieving objects similar to a specified object, or summarizing the relations among objects (but using different typed data) has been long underway in the information retrieval community [5], [6]. However, the data in these works are unstructured text.

Hence there is a need for a method of handling categorical data in a manner that permits identification of additional hypotheses and relationships in the data.

Background References

[1] Y. M. M. Bishop, Feinberg, S. E. and Holland, P. W. *Discrete Multivariate Analysis: Theory and Practice*. MIT Press, 1975.

[2] Alan Agresti. *Categorical Data Analysis*. John Wiley & Sons. 1990.

[3] N. E. Breslow and N. E. Day. *Statistical Methods in Cancer Research*. IARC Scientific Publications No. 32. 1980.

[4] George Michailidis and Jan de Leeuw, "GIFI System of Descriptive Multivariate Statistics" *Statistical Science* 13(4) 307–336, 1998.

[5] Deerwester, S., Dumais, S. T., Landauer, T. K., Furnas, G. W. and Harshman, R. A. (1990)—no figures, "Indexing by latent semantic analysis." *Journal of the Society for Information Science*, 41(6), 391–407.

[6] Howard R. Turtle and W. Bruce Croft. "A comparison of text retrieval models." *Computer Journal*, 35(3): 279–290, Jun. 1992.

SUMMARY OF THE INVENTION

The present invention provides a method of generating analyses of categorical data that will allow the application of exploratory multivariate analysis procedures constructed from inner products, distances, vector additions, and scalar multiplications to said categorical data having a plurality of responses. The method comprises the steps of encoding categorical data to provide a plurality of probability distribution representations, transforming exploratory multivariate analysis procedures based on inner products, distances, vector additions and scalar multiplications to work with probability distribution representations, and applying the transformed exploratory multivariate analysis procedures to the probability distribution representation to allow browsing, retrieving and viewing of said converted categorical data.

Whereas previously, each response to a question might have been modeled as an outcome from a multinomial probability distribution, according to the present invention each response is represented as a probability distribution. With this encoding or conversion, the vector of measurements for each individual can be viewed as a member of the linear space that includes vectors of probability distributions.

An advantage of the present invention is that existing methods for representing and manipulating numerical data can be adapted for the converted categorical data. In other words, the representation of categorical data as vectors of discrete probability distributions allows the use of standard clustering, projection, and/or visualization algorithms. A collection of vectors of probability distributions can be used to create a linear space; by the standard method of taking all linear combinations of the vectors of probability distributions. The present invention has the further advantage of permitting identification of more than one hypothesis from a categorical data set.

The data are represented and treated so that a visual, exploratory analysis of the data becomes possible. The present invention effectively permits the data to suggest hypotheses by virtue of the distribution encoding and adaptation of existing exploratory analysis methods.

One object of the present invention is to provide a method for clustering objects based on categorical measurements taken on objects and/or responses.

Another object is to provide a method for trending objects and/or responses.

It is a further object to provide a method for trending objects and/or responses based on categorical measurements taken on said objects and/or responses.

Yet another object is to provide a method for segmenting a sequence or time series of objects and/or responses.

It is a further object to provide a method for segmenting a sequence or time series of objects and/or responses based on categorical measurements taken on said objects or/and responses.

Another objective is to provide a method for classifying objects and/or responses.

It is a further object is to provide a method for classifying objects and/or responses based on categorical measurements taken on objects and/or responses.

Yet another object is to provide a method for detecting relatedness and periodic patterns in sequences of objects and/or responses.

It is a further object to provide a method for detecting relatedness and periodic patterns in sequences of objects and/or responses based on categorical measurements taken on said sequence of objects and/or responses.

Another object is to provide a method for generating continuous, numeric data from cluster relationships.

Yet another object is to provide a method for encoding vectors of categorical data embodied in Java language.

Another object is to provide a method that allows a novel, holistic view of the objects and/or responses on which the categorical data measurements were taken.

Yet another object is to provide a method for generating categorical data vectors that allow the generalization of standard clustering, projection and ultimately visualization algorithms to said categorical data.

Another object is to permit available methods including but not limited any technique that does not depend directly on fitting a probability distribution such as maximum likelihood estimation.

Still another object is to provide a method of handling categorical data in a manner that permits identification of additional hypotheses and relationships in the categorical data.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

The patent or application file contains at least one drawing executed in color. Copies of this patent or patent application publication with color drawing(s) will be provided by the office upon request and payment of the necessary fee.

DETAILED DESCRIPTION

Figure 1A:
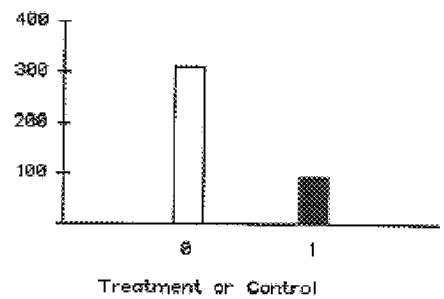
FIG. 1 is a graphic showing the properties of individuals receiving treatment selected, shown as highlighted circles.

According to the first aspect of the present invention, a method for generating analyses of categorical data that will allow the application of exploratory multivariate analysis procedures constructed from inner products, distances, vector additions, and scalar multiplications to said categorical data having a plurality of responses.

The first aspect of the present invention may be expressed as a method for generating analyses of categorical data. The method has the steps of:

encoding said categorical data to provide a plurality of probability distribution representations, transforming said exploratory multivariate analysis procedures based on inner products, distances, vector additions and scalar multiplications to work with said probability distribution representations, and applying said transformed exploratory multivariate analysis procedures constructed from inner products, distances, vector additions, and scalar multiplications to said probability distribution representation of said categorical data to allow browsing, retrieving and viewing of said converted categorical data.

The present invention is useful for grouping a plurality of objects into a plurality of groups, having the known steps of:

(a) obtaining at least one measurement for each of the plurality of objects; and (b) using the at least one measurement and assigning each of the plurality of objects to the plurality of groups.

According to the present invention, the improvement is realized when the measurement is a categorical measurement and each response of the categorical measurement is converted to a probability distribution as a representation or encoding.

According to the present invention a probability distribution may be discrete or continuous, normalized (all elements sum to 1) or non-normalized. In a preferred embodiment, the probability distribution is discrete and normalized with all its mass in one cell. Alternatively, the probability distribution may be a discrete distributed probability distribution wherein its mass is discretely distributed across at least two cells thereby reflecting or preserving order of other relations among categories. Another alternative is a probability distribution that is a continuous distributed probability distribution wherein its mass is continuously distributed across a continuous space into which the categories have been embedded. Again, whether discrete or continuous, the distributions may be normal or non-normal.

The present invention permits available methods including but not limited any technique that does not depend directly on fitting a probability distribution such as maximum likelihood estimation. Useful techniques include but are not limited to least squares, spectral decomposition, cluster analysis, self-organizing maps, classification, discriminant analysis, CART (Classification and Regression Trees), pattern recognition, chemometric techniques, display of continuous multivariate data, dimension reduction and ordination, multivariate linear modes, and transforms. Chemometric techniques include but are not limited to partial least squares, principal components regression, multivariate curve resolution, generalized rank annihilation, and parallel factor analysis. Displays of continuous multivariate data or multivariate graphical techniques include but are not limited to glyph plots, tree representations, and outlier and Influence plots. Dimension reduction and ordination includes but is not limited to principal components analysis, singular value decomposition, factor analysis, multidimensional scaling, and canonical correlation analysis. Multivariate linear models include but are not limited to regression and multivariate analysis of variance. Transforms include but are not limited to Fourier, Windowed Fourier, and Wavelet.

Figure 1B:
Figure 2:
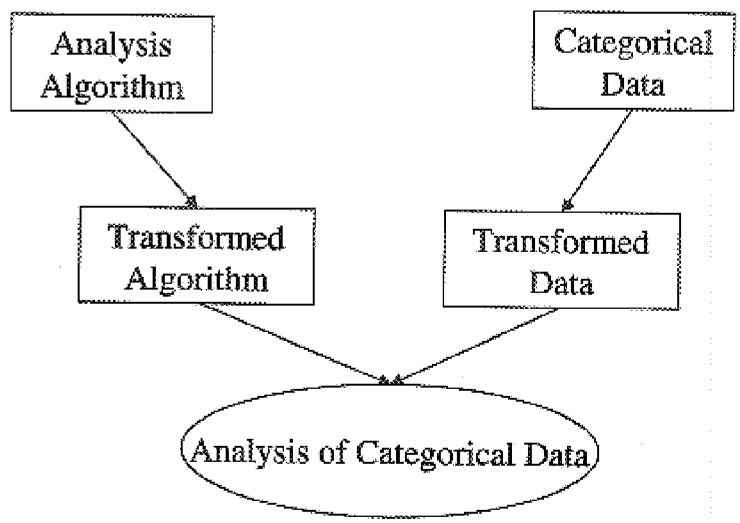
FIG. 2a is a graphic discrete distribution representing the answer to Q1 for object k.
FIG. 2b is a graphic of a discrete distribution representing the answer to Q1 for object k'.

FIG. 1a shows a bar chart representation of patients receiving a treatment (labeled with a "1") or not (labeled with a "0"). The graph is "live", so the analyst selected the bar labeled "1" with a mouse-click. This selection is reflected in the summary graph shown in FIG. 1b. The view in FIG. 1b is actually slightly rotated view of the data from FIG. 1a. The figure indicates a region containing the symptoms for the individuals receiving the treatment. The underlying projection can then be examined to reveal what the actual symptoms might be. The resulting examination could reveal unexpected results from the treatment. FIGS. 1a and 1b are sufficient to motivate, but not limited to, the following capabilities: calculation and display of a holistic view of the data, standard categorical displays (e.g. the bar chart presented in FIG. 1), ability to "drill down" to the underlying symptoms and/or patient properties, linking of information across multiple views, and interactive sub setting and highlighting. Colors may be used to correspond with clusters estimated from the same data. Note that while the methodologies are adaptable to this data type, suitable implementations do not exist for these algorithms, except for the prototype implementations developed herein. FIG. 2 shows a flow chart that represents suitable implementations, which refer to the modified pca and cluster algorithms.

Figures 3A, 3B:
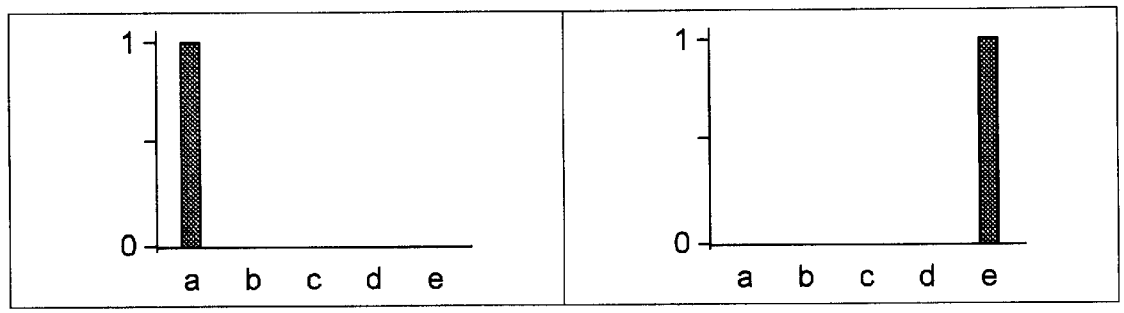
FIG. 3 is a flow chart showing creation of an analysis of categorical data.

The key step in quantifying the categorical observations is to re-interpret or convert the coded answers as discrete probability distributions with all their mass at the answer. For instance, for objects k and k' in Table 1, a graphic representation of the discrete distributions are shown in FIGS. 3a, 3b. With this interpretation, the raw data is construed as a vector of discrete distributions for each object. The data in the table can be rewritten as probability distributions $p_{ij}$, where $p_{ij}$ is the distribution for the $j^{th}$ question from the $j^{th}$ object. With this perspective, the data in Table 1 are viewed as the observed probability distributions in Table 2.

TABLE 2

Categorical Data Converted to Probabilities

| Person/Object | Q1 | Q2 | Q3 | Q4 |
| --- | --- | --- | --- | --- |
| 1 | P11 | P12 | P13 | p14 |
| 2 | P21 | P22 | P23 | p24 |
| 3 | P31 | P32 | P33 | p34 |
| ... | | | | |
| M | Pm1 | Pm2 | Pm3 | pm4 |
| ... | | | | |
| N | Pn1 | Pn2 | Pn3 | pn4 |
| ... | | | | |

The vector for the k-th object, a vector of probability distributions, is written: $(p_{k1}, p_{k2}, p_{k3}, \ldots)$.

Once this interpretation or conversion of the data is made, for a particular question, distances, inner products and averages between the responses individuals provide can then be calculated. The same quantities can then be calculated between individuals. Since these quantities can be calculated, the algorithms for numerous standard statistical and data analytic procedures became available for this data. Example formulas for the distance, inner product and averages are given below.

Distances

For probability densities p and q, the Hellinger and $L_1$ distances are $$d(p,q) = \{\int (\sqrt{p} - \sqrt{q})^2\}^{1/2}$$

and $$d(p,q) = \int |p-q|,$$

respectively.

When applied to calculating the distances between distributions both of these distances amount to observing whether or not the same category was observed for Question 1. Distances between the objects can be calculated based on a sum of the distances between the individual questions. For instance:

distance between $k$ and $k' = d(p_{k1}, p_{k'1}) + d(pk_2, p_{k'2}) + d(p_{k3}, p_{k'3}) + d(p_{k4}, p_{k'4})$.

Note that a weighted sum may also be used. Once distances between objects can be calculated, various exploratory cluster analyses (e.g. the Leader Algorithm and the numerous varieties of hierarchical cluster analyses) can be calculated.

Inner Products

Inner products between densities can be calculated as well; an example is the Hellinger affinity $<p,q> = \int \sqrt{pq}$. An inner product between the observations can be calculated as a weighted average between inner products of the individual observations:

inner product between $k$ and $k' = <p_{k1}, p_{k'1}> + <p_{k2}, p_{k'2}> + <p_{k3}, p_{k'3}> + <p_{k4}, p_{k'4}>$.

Inner products are used to form principle-component-like projections of the observation vectors into a "viewable" space. A matrix of inner products between the objects is formed; the eigen-vectors of this matrix are the principal-components projection. Note that the first eigen-vector is not used to form the projection, since this eigen-vector is mostly formed based on the strong positivity of the matrix.

Linear Combinations

Averages of the raw distribution vectors can also be constructed. For instance, the average of the first component of the distribution vectors for objects k and k' is, mathematically:

$$\frac{1}{2}p_{k1} + \frac{1}{2}p_{k'1}.$$

The average of any number of distributions is still a probability distribution; and so distances between the observations representing distances and averages can be calculated using standard distances between distributions. The significance of this observation is that now K-Means clustering algorithms (as well as self-organizing maps) can be calculated based on these vectorizations. This clustering is a key step in obtaining the final vectorization of the categorical data.

EXAMPLE

Centering and Re-scaling a Categorical Data matrix

A data matrix A of transformed categorical data is centered when the columns sum (and hence average) to the zero vector for the corresponding space $H_1$. With the modifications indicated for compatible matrices; the centered version of Hilbert space matrix A can be calculated as:

$$A - \frac{1}{n}1_n1'_nA$$

where $1_n$ is an n-vector containing 1 in each entry.

Correlation scaling of a Hilbert space matrix is done by observing first that the analogue of calculating a variance of numbers for the Hilbert space setting is:

$$\frac{1}{n-1}\sum_{i=1}^{n}(X_i - \overline{X})^2 \leftrightarrow \frac{1}{n-1}\sum_{i=1}^{n}\langle X_i - \overline{X}, X_i - \overline{X}\rangle \qquad (0.1)$$

where the expression on the left is the standard variance formula for numbers, and the expression on the right is the proposed variance expression for Hilbert space objects (all the objects are in the same space for this formula).

It's worth considering how this "variance" would work for vectors; in particular, how the variance is related to the covariance for the vectors. Working with the right-hand side of (1.9), and with $\chi_1 \in R^k$ and the inner product the usual, the quantity in (1.9) is $$\frac{1}{n-1}\sum_{i=1}^{n}\langle X_i - \overline{X}, X_i - \overline{X}\rangle = \frac{1}{n-1}\sum_{i=1}^{n}(X_i - \overline{X})^t(X_i - \overline{X}) = \text{trace}(S)$$

where S is the usual covariance matrix.

EXAMPLE

Autocovariance of a protein

A straightforward modification of the formula for autocovariance of a numeric time series provides a formula that can be used for the more general setting described here:

$$\gamma(k) = \frac{1}{n}\sum_{i=1}^{n-k}\langle x_{i+k}, x_i\rangle$$

Spectra can be calculated based on these autocovariances.

Figure 4:
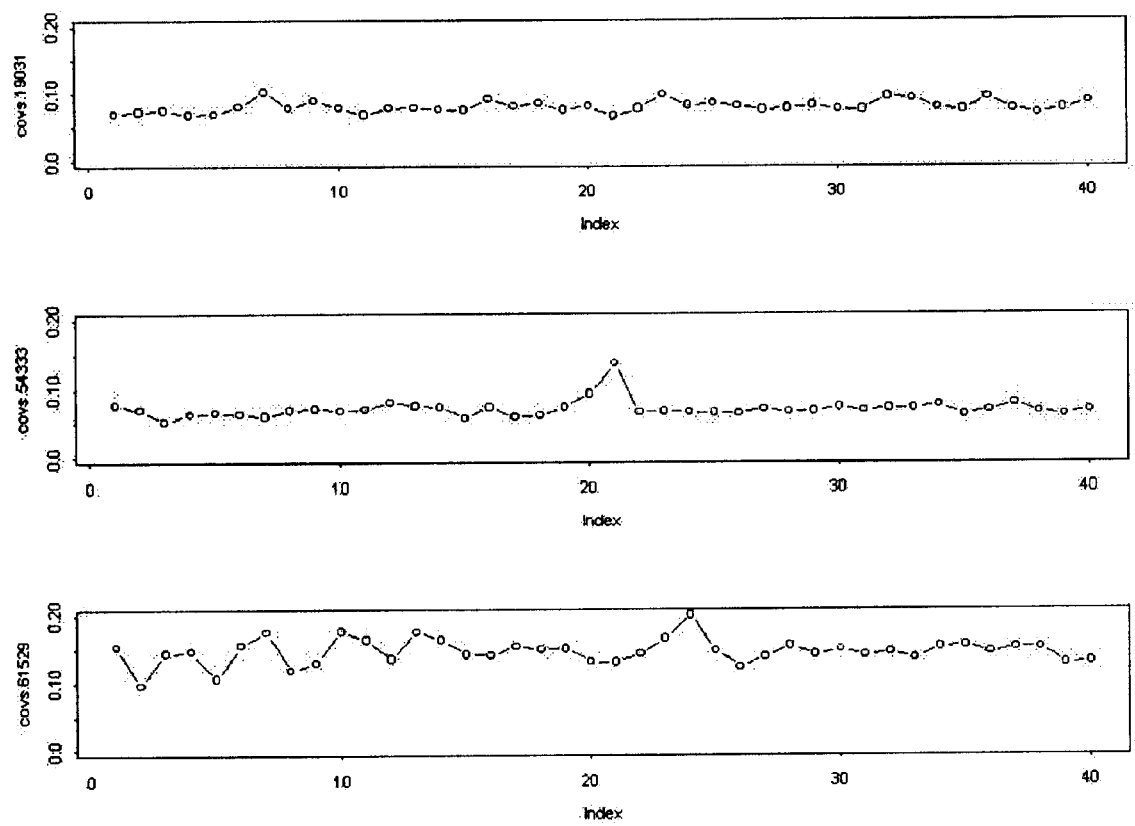
FIG. 4 is a graphic showing the autocovariance function calculated for the protein.

FIG. 4 shows the autocovariance function calculated for the protein. The autocovariances calculated were based on the modified formula above, and the transformation used on the data was that protein's were viewed as amino acid sequences, which were in turn encoded as distinct discrete probability masses.

EXAMPLE

Projection of a collection of objects based on categorical data

An experiment was conducted to demonstrate the present invention using raw data of key words describing images. These data can be construed as categorical data by viewing the entire list of key-words as the "Questions"; the presence of the key word for an image can be construed as answering the question "Yes". The vectorization and 2-D projection were applied to the key word index from an image archive.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of generating analyses of categorical data that will allow the application of exploratory multivariate analysis procedures constructed from inner products, distances, vector additions, and scalar multiplications to said categorical data having a plurality of responses, the method comprising the steps of:
   a. encoding said categorical data to provide plurality of probability distribution representations,
   b. transforming said exploratory multivariate analysis procedures based on inner products, distances, vector additions and scalar multiplications to work with said probability distribution representations, and
   c. applying said transformed exploratory multivariate analysis procedures constructed from inner products, distances, vector additions, and scalar multiplications to said probability distribution representation of said categorical data to allow browsing, retrieving and viewing of said converted categorical data.

2. The method as recited in claim 1, further comprising labeling said categorical data as ordinal or nominal measurement.

3. The method as recited in claim 2, further comprising constructing a distribution representation for said ordinal measurements, so that the probability mass is smeared across adjacent categories.

4. The method as recited in claim 3, wherein the amount of said smear is a parameter.

5. The method as recited in claim 2, further comprising constructing a point mass distribution on the response category for said nominal measurements.

6. The method as recited in claim 1, further comprising providing said probability distribution with its mass in one cell.

7. The method as recited in claim 1, further comprising providing said probability distribution as discrete distributed probability distribution.

8. The method as recited in claim 1, further comprising providing said probability distribution representations as continuously distributed probability distribution.

9. The method as recited in claim 1, wherein the probability distribution representation of said categorical data is a vector of discrete probability distribution.

10. The method as recited in claim 1, wherein said multivariate analysis procedures are selected from the group consisting of least squares, spectral decomposition, self-organizing maps, classification, discriminant analysis, pattern recognition, chemometric techniques, display of continuous multivariate data, dimension reduction and ordination, multivariate linear modes, and transforms.

11. The method as recited in claim 1, wherein said categorical data is selected from the group comprising of clinical data, survey data, data mining, patents, warranty cards and combinations thereof.

12. The method as recited in claim 11, further comprising labeling said categorical data as ordinal or nominal measurement.

13. The method as recited in claim 12, wherein the amount of said smear is a parameter.

14. The method as recited in claim 11, further comprising providing said probability distribution with its mass in one cell.

15. The method as recited in claim 11, further comprising providing said probability distribution as discrete distributed probability distribution.

16. The method as recited in claim 11, further comprising providing said probability distribution representations as continuously distributed probability distribution.

17. The method as recited in claim 11, wherein the probability distribution representation of said categorical data is a vector of discrete probability distribution.

18. The method as recited in claim 11, wherein said multivariate analysis procedures are selected from the group consisting of least squares, spectral decomposition, self-organizing maps, classification, discriminant analysis, pattern recognition, chemometric techniques, display of continuous multivariate data, dimension reduction and ordination, multivariate linear modes, and transforms.

19. The method as recited in claim 11, wherein said categorical data is selected from the group comprising of clinical data, survey data, data mining, patents, warranty cards and combinations thereof.

20. A method of generating analyses of categorical data that will allow the application of exploratory multivariate analysis procedures constructed from inner products, distances, vector additions, and scalar multiplications to said categorical data having a plurality of responses, the method comprising the steps of:
  a. encoding said categorical data into members of a linear space,
  b. transforming said exploratory multivariate analysis procedures based on inner products, distances, vector additions and scalar multiplications to work with said members of linear space, and
  c. applying said transformed exploratory multivariate analysis procedures constructed from inner products, distances, vector additions, and scalar multiplications to said members of linear space to allow browsing, retrieving and viewing of said converted categorical data.

21. The method as recited in claim 20, further comprising constructing a distribution representation for said ordinal measurements, so that the probability mass is smeared across adjacent categories.

22. The method as recited in claim 20, further comprising constructing a point mass distribution on the response category for said nominal measurements.

23. A method for analyzing categorical data having a plurality of responses comprising:
  encoding said categorical data into probability distribution representations, wherein each response of said categorical data is converted to a corresponding probability distribution representation,
  transforming exploratory multivariate analysis procedures to work with said probability distribution representations, and
  applying said transformed exploratory multivariate analysis procedures to said probability distribution representations to allow browsing, retrieving and viewing of said categorical data.

24. The method of claim 23 further comprising labeling said categorical data as ordinal or nominal measurement.

25. The method of claim 24 further comprising constructing a distribution representation for said ordinal measurements, so that the probability mass is smeared across adjacent categories.

26. The method of claim 25 wherein the amount of said smear is a parameter.

27. The method of claim 24 further comprising constructing a point mass distribution on the response category for said nominal measurements.

28. The method of claim 23 further comprising providing said probability distribution with its mass in one cell.

29. The method of claim 23 further comprising providing said probability distribution as discrete distributed probability distribution.

30. The method of claim 23 further comprising providing said probability distribution representations as continuously distributed probability distribution.

31. The method of claim 23 wherein the probability distribution representation of said categorical data is a vector of discrete probability distribution.

32. The method of claim 23 wherein said multivariate analysis procedures are selected from least squares, spectral decomposition, self-organizing maps, classification, discriminant analysis, pattern recognition, chemometric techniques, display of continuous multivariate data, dimension reduction and ordination, multivariate linear modes, and transforms.

33. The method of claim 23 wherein said categorical data is selected from clinical data, survey data, data mining, patents, warranty cards and combinations thereof.

* * * * *